(12) United States Patent
Corsi et al.

(10) Patent No.: US 10,733,027 B2
(45) Date of Patent: Aug. 4, 2020

(54) MEMORY ALLOCATOR

(71) Applicant: HEWLETT PACKARD ENTERPRISE DEVELOPMENT LP, Houston, TX (US)

(72) Inventors: Christopher J. Corsi, Durham, NC (US); Sudhanshu Goswami, Durham, NC (US); Kevin Kauffman, Durham, NC (US)

(73) Assignee: Hewlett Packard Enterprise Development LP, Houston, TX (US)

(*) Notice: Subject to any disclaimer, the term of this patent is extended or adjusted under 35 U.S.C. 154(b) by 115 days.

(21) Appl. No.: 16/153,792

(22) Filed: Oct. 7, 2018

(65) Prior Publication Data

US 2020/0110639 A1 Apr. 9, 2020

(51) Int. Cl.
*G06F 9/50* (2006.01)
*G06F 12/02* (2006.01)
*G06F 9/30* (2018.01)

(52) U.S. Cl.
CPC .......... *G06F 9/5077* (2013.01); *G06F 9/3004* (2013.01); *G06F 9/5016* (2013.01); *G06F 12/0246* (2013.01); *G06F 2209/5021* (2013.01); *G06F 2209/5022* (2013.01); *G06F 2212/1044* (2013.01); *G06F 2212/2542* (2013.01)

(58) Field of Classification Search
CPC .................................................. G06F 9/5077
See application file for complete search history.

(56) References Cited

U.S. PATENT DOCUMENTS

| 6,175,900 B1 | 1/2001 | Forin et al. | |
| 2008/0162830 A1* | 7/2008 | Marathe | G06F 12/023 |
| | | | 711/154 |
| 2016/0371194 A1* | 12/2016 | Wagle | G06F 9/5016 |
| 2018/0203734 A1* | 7/2018 | Lowery | G06F 9/50 |

FOREIGN PATENT DOCUMENTS

| WO | WO-2008044865 A1 | 4/2008 |
| WO | WO-2017011223 A1 | 1/2017 |

OTHER PUBLICATIONS jemalloc.net, "JEMALLOC," Jul. 3, 2018, 29 pages; <https://web.archive.org/web/20180703013749/http://jemalloc.net/jemalloc.3.html>.

(Continued)

*Primary Examiner* — Sisley N Kim
(74) *Attorney, Agent, or Firm* — Nolte Intellectual Property Law Group

(57) ABSTRACT

This disclosure is directed to a technique for memory management where physical memory areas may be partitions into a hierarchy of portions, the hierarchy may include a domain level that includes a page level that includes a slice level that includes an object level. Objects within a slice are a consistent size but may be different sized for different slices. A set of states reflecting memory usage status for each of the slices includes: a clean state for unused; a partial state; a full state; and a dirty state. Responses to allocation requests may be performed by selecting objects that are in a most preferred state based on a state allocation cost and a memory allocation cost either alone or in combination. A compact memory layout may be used to reduce run-time fragmentation of memory.

18 Claims, 8 Drawing Sheets

(56) References Cited

OTHER PUBLICATIONS jemalloc.net, "jemalloc: memory allocator," Jul. 13, 2018, 2 pages; <https://web.archive.org/web/20180713165830/http://jemalloc.net/>.

Sanjay Ghernawat et al., "TCMalloc : Thread-Caching Malloc," Jul. 13, 2018, 5 pages; <https://web.archive.org/web/20180713173200/http://goog-perftools.sourceforge.net/doc/tcmallochtml>.

Aigner, M. et al., "Fast, Multicore-Scalable, Low-Fragmentation Memory Allocation Through Large Virtual Memory and Global Data Structures," Aug. 25, 2015.

Drebes, A. et al., "NUMA-aware Scheduling and Memory Allocation for data-flow task-parallel Applications," Mar. 2016, https://www.research.manchester.ac.uk/portal/files/31439972/FULL_TEXT.PDF.

github.com, "Rampantpixels/rpmalloc-benchmark: Benchmarks for our Memory Allocator," Feb. 15, 2018, https://github.com/rampantpixels/rpmalloc-benchmark.

\* cited by examiner

MEMORY ALLOCATOR

BACKGROUND

In the field of computing, memory management refers to allocating, protecting, and deallocating (e.g., reclaiming) memory areas that are used for application processing and operating system operations. Application processing and operating system operations may include threads, processes, or applications and may be generally referred to as "execution units," Different types of memory exist in a computer system and include non-persistent and persistent storage that may have different speeds with respect to access time. Memory types may be conceptualized as a hierarchy of storage. Generally, the lower a storage is in the hierarchy, the lesser its bandwidth and the greater its access latency (i.e., time required to access) is from a central processing unit (CPU). This traditional division of storage to primary, secondary, tertiary and off-line storage may also be guided by cost per amount of storage with lower latency bulk storage representing less expensive (monetarily). Even though bulk storage may be less expensive from a monetary perspective, it may have a higher cost from a run-time compute perspective (e.g., run-time access and performance cost) because it takes more time to transfer data to and from such storage.

As used in this disclosure, "memory" or "memory storage" may refer to semiconductor storage read-write random-access memory, typically DRAM (dynamic RAM) or other forms of fast but temporary storage. "Storage" (e.g., without a qualifier such as "memory" or "primary") typically refers to storage devices and their media not directly accessible by the CPU (e.g., secondary or tertiary storage), typically hard disk drives, optical disc drives, and other devices, slower than RAM but non-volatile and "persistent" (retaining contents when powered down). In this context, directly accessible refers to being accessed by the processing unit without going through a device controller or off-board communication bus to gain access to data stored within the directly accessible memory. That is, the memory is accessible to the processing unit using circuitry that allows direct access for reading and writing. However, in some instances there may be a memory controller that assists the CPU in directly accessing memory areas. In this context, a memory controller should not be considered a device controller for the purposes of this distinction with respect to direct access. Disclosed examples reference memory allocation for fast access memory such as RAM that is directly accessible to a CPU (or another processor type). However, similar techniques may also be used in certain types of storage allocation implementations. Historically, memory has also been referred to as core memory, main memory, real storage, or internal memory. Meanwhile, non-volatile storage devices have been referred to as, secondary storage, external memory, or auxiliary/peripheral storage.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on, design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Examples of the subject matter claimed below will now be disclosed. In the interest of clarity, not all features of an actual implementation are described in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 3:
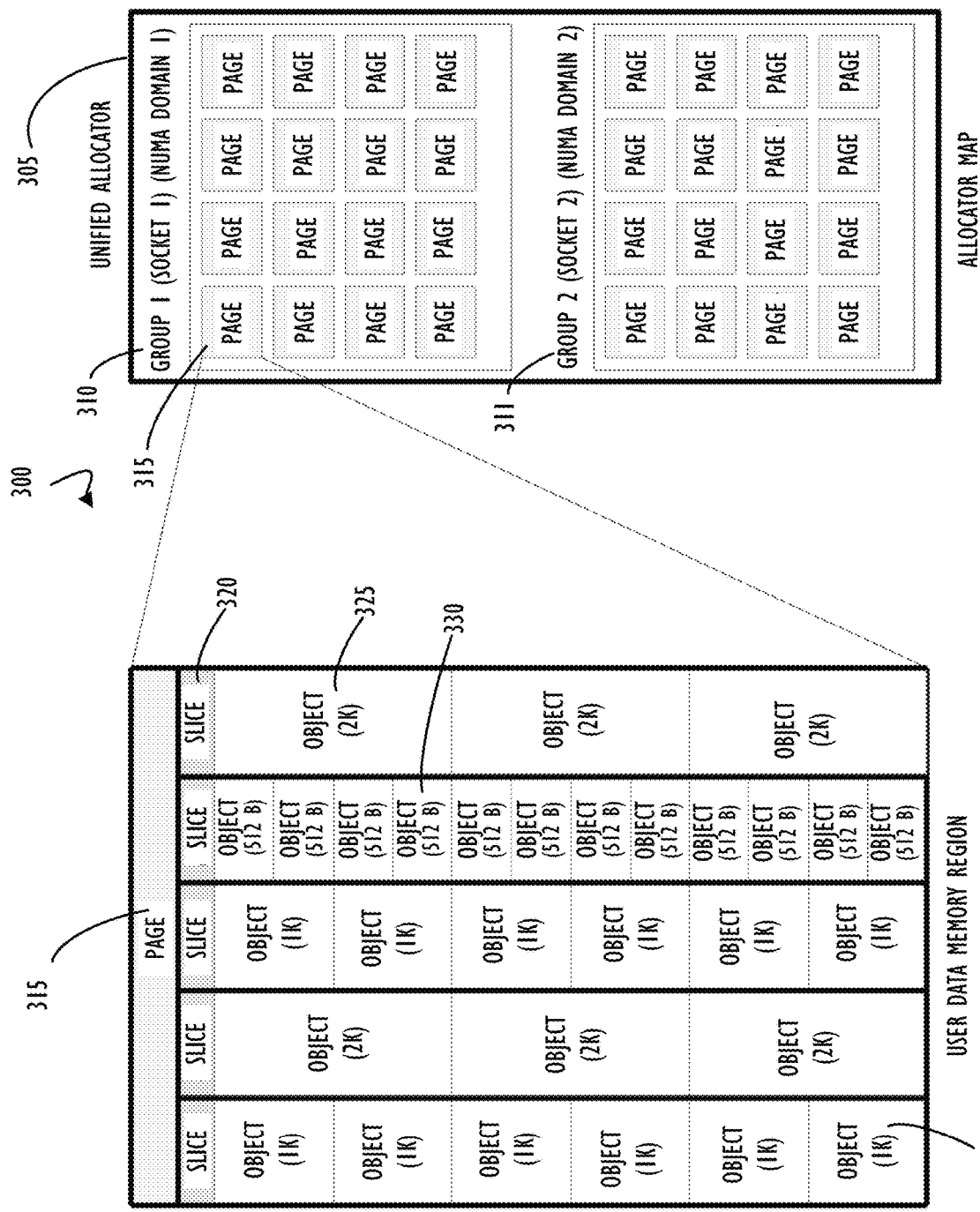
FIG. 3 is a block diagram representing a memory allocation segmentation example including domains, pages, slices, and objects, according to one or more disclosed implementations.

In computer device operating systems, memory management typically refers to the function responsible for managing the computer's primary memory. In most implementations, the memory management function keeps track of the status of each memory location, either allocated or free. Memory management determines how memory is allocated among competing processes, deciding which process gets memory, when they receive memory, and how much memory they are allowed. When memory is allocated to an execution unit, the memory management function determines which physical memory locations will be assigned. It tracks when memory is freed or unallocated and updates the status. In some implementations, the memory management function will manage the size of contiguous chunks of memory (e.g., domains, pages, slices, or objects as illustrated in FIG. 3) to allocate based on each allocation request from an execution unit executing on an associated CPU. Memory may be dedicated to a particular CPU or shared across several CPUs and the memory management function may allocate portions of physical memory based on access requirements provided by the requesting execution unit. Additionally, some CPUs may have more than one core and the memory management function may also take into account coordination of allocation and access across the multiple cores.

This disclosure presents an improvement to memory allocation techniques and overall memory management functionality. In particular, improvements to operation of a computer system may be achieved in systems implementing the disclosed techniques. Specifically, an improved memory management function, utilizing the concepts of this disclosure, may increase the speed and efficiency of a computing device to perform its function. Disclosed techniques are not limited to any specific type of computer application. However, some devices, such as dedicated appliances that run continuously with limited restarting, may recognize a larger increase in performance than other devices. The increase in performance may depend on the types of applications, number of applications, and overall configuration (e.g., number of different memory areas, size of different memory areas, processors, and architecture of memory areas with respect to processors) of the computing device.

Figure 1:
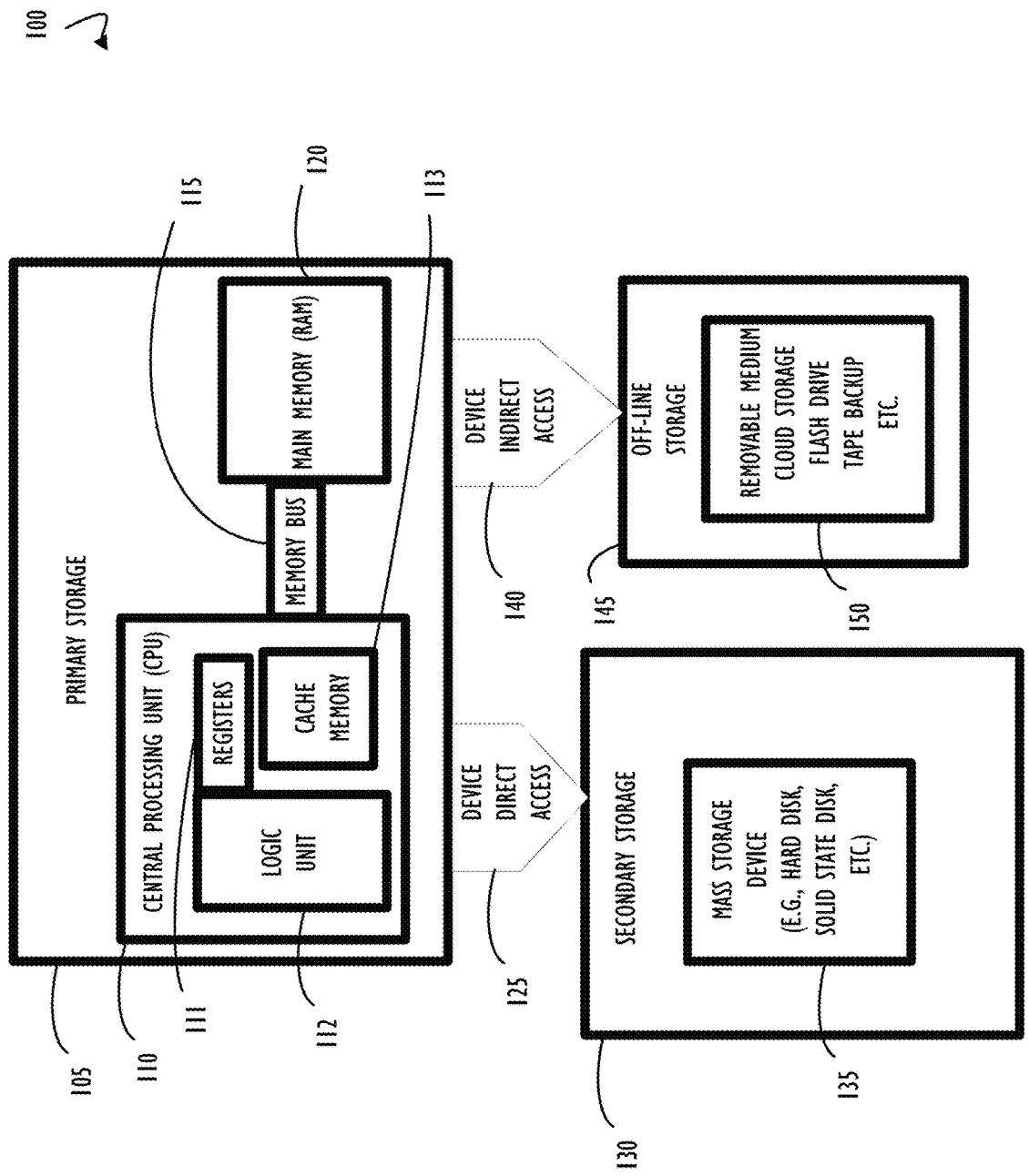
FIG. 1 is a functional block diagram representation of a memory/storage hierarchy and types of access to each level of the hierarchy, according to one or more disclosed implementations.

Referring to FIG. 1, block diagram 100 illustrates a functional block diagram representation of a memory/storage hierarchy and types of access to each level of the hierarchy, according to one or more disclosed implementations. This hierarchy is conceptual and provided here to aid in this discussion. In practice (e.g., real world implementations), variations of this hierarchy may exist based on implementation requirements. In this conceptual example, primary storage 105 includes central processing unit (CPU) 110 that in turn includes logic unit 112. Primary storage 105 also includes main memory 120 (e.g., random access memory (RAM)) directly accessible to CPU 110 through memory bus 115. Other internal memory such as registers 111 and cache memory 113 are also included locally on CPU 110 and represent memory areas directly accessible to CPU 110 even without utilizing memory bus 115 (e.g., because they are local to an integrated circuit (IC) that includes the CPU). In the context of this hierarchy, primary storage represents the only area of storage memory directly accessible to the CPU. The CPU may continuously read instructions stored in primary storage and execute those instructions as required. Also, data that is actively in use by execution units (e.g., threads, processes, applications, or the operating system) may also be stored in primary memory in a uniform manner. In this context, "uniform manner" indicates that primary storage may be accessed based on one or more memory allocation techniques such that consistent, and predictable access across execution units is maintained.

In addition to primary storage 105, there are two additional levels of storage illustrated in the memory hierarchy of block diagram 100. The first, of the two additional levels, is referred to, in this example, as secondary storage 130. Secondary storage 130 represents storage that is device directly accessible (see block arrow 125) to a computer that includes primary storage 105 and CPU 110. This type of device direct access (block arrow 125) is not to be confused with the direct access to components of primary storage 105 by the CPU mentioned above. In this case, the secondary storage is device directly accessible in that it is on the same device as opposed to having direct access to the CPU itself. This device direct access may also include storage areas accessible using a device driver and/or some sort of IO controller that may allow access without interacting with another device (e.g., a network switch, or file server). That is, secondary storage 130 may be integrated into a computer device as an "always present" part of that computer device. Secondary storage 130 may include mass storage devices 135 that may include hard disks, solid state drives, or other types of mass storage.

The second, of the two additional levels, is referred to, in this example as off-line storage 145 that may not be an integrated part of the computer device. For example, off-line storage 145 may be "only sometimes present or accessible" to the computer device. To access off-line storage 145, device indirect access (see block arrow 140) may be provided by a network controller or by a controller that may be configured to access removable medium. The removable medium is not considered integrated into a computer device (e.g., because it may be optionally removed at times). Off-line storage 145 also includes cloud storage, flash drives, tape backup, or other types of storage (e.g., a network file server or network attached storage device) not necessarily integrated and dedicated to a particular computer device. Many types of off-line storage are available, and the above types are used only as examples.

For simplicity and ease of explanation, the examples of this disclosure will be explained based to the first of these three conceptual levels (primary storage 105). Specifically, examples used herein will be directed to management of RAM 120 to explain the disclosed unified memory allocation techniques. However, those of ordinary skill in the art, given the benefit of this disclosure, will understand that the disclosed memory management techniques may be applicable at all levels of conceptual block diagram 100. Accordingly, unless explicitly stated, the techniques of this disclosure may be implemented, in full or in part, at any device or set of related devices that store data for processes of a central processing unit (e.g., CPU 110).

Latency refers to the time it takes to access a particular location in memory or storage (or may be an attribute of the storage medium itself). In effect, higher latency storage takes more time to access than lower latency storage. Different types of storage implementations will typically have different levels of latency. Latency may be affected by the speed of the storage medium. Specifically, in most implementations, registers 111 are faster than cache memory 113 which is in turn faster than RAM 120. Also, different types of RAM 120 may operate at different internal speeds and their physical/logical association with an accessing CPU may impact access latency. The physical/logical association referenced here refers to where the memory is located (e.g., on a motherboard or printed circuit board) with respect to CPU 110 and how CPU 110 may access that memory. Specifically, some memory may be on the same IC with CPU 110 (e.g., registers 111 and cache memory 113) and would therefore likely be faster than memory that is accessed through a communication bus (e.g., RAM 120 accessed through memory bus 115). Also, sometimes memory access may have to be coordinated through another processor (e.g., another CPU or memory controller) and that extra circuitry will likely increase the access latency. Still further, some types of storage may be located internal to a device with a CPU (e.g., device direct access) or may be located in a device remote from the CPU (e.g., device indirect access). Simply put, latency may be affected by a number, of factors and may be generally thought of, and referred to herein, as a "closeness" to the accessing CPU such that the "closer" a memory area is to an accessing CPU, the faster (e.g., lower latency) the overall access of that memory may be performed by the accessing CPU. Closeness of a memory area should not necessarily be considered a physical closeness in all cases but should take into account an amount of circuitry that must be traversed to access that memory area. The relevant unit of measurement for latency is typically nanosecond for primary storage 105, millisecond for secondary storage 130, and second for off-line storage 145 (sometimes referred to as tertiary storage). For some types of storage/memory, it may make sense to separate read latency and write latency (especially for non-volatile memory). In case of sequential access storage, there may be more than one measurement of latency to consider because sequential access storage may have access overhead that depends on a memory location being accessed and is therefore variable. In some cases, sequential access storage latency access latency may be treated as having three access measurements, such as, minimum, maximum, and average latency.

In different disclosed implementations, there may be a set of rules about how different individual portions (e.g., segments, partitions, pages, slices, objects, etc.) of memory are allowed to transition between different states. These rules may vary in different implementations. In computer science vernacular, there are many terms for portions of memory and sub-portions of memory for different implementations of memory management. An example breakdown of logical memory portions for this disclosure is discussed further below but at the highest level is a physical partition which has an association to physical hardware in a computer system as explained next.

In the disclosed implementations, memory will be referenced in segments beginning with a physical partition of memory (e.g., a memory card or multiple memory cards presenting one contiguous section of physical memory and may be associated with a socket number). In this context, socket number represents the physical socket on the motherboard that holds a CPU. Additionally, physical memory "sticks" (e.g., ICs of memory, such as a single in-line memory module SIMM or dual in-line memory module DIMM) may be plugged into the motherboard in such a manner that they are associated with a particular CPU at a physical socket. These associations of memory slots (e.g., holding memory sticks) to CPU sockets may be dictated by the circuitry of the motherboard. In some cases, even for a single CPU socket, there may be two different sticks attached to that socket with, for example, one stick on the left side of the processor and the other stick is on the right side of the processor. That means the some of the processor pieces will be closer to one memory stick than the other. As a result, there may be faster access (less latency) to one of the two sticks because, for the "further" stick, memory access has to travel through more of the processor circuitry to get to the further stick. Disclosed implementations apply to both single CPU implementations and multi-CPU implementations. However, in the case where there are multiple CPUs, latency differences to different memory sticks may be more prevalent. This effect on latency is, in part, because distances (e.g., not literal distance with respect to space, but instead the amount of circuitry and time to traverse that circuitry for access) between each socket to each stick will vary, thus creating a likely different latency for each association of CPU to memory stick.

To summarize, at a high level, if a computer system has two different CPU sockets, and the motherboard includes multiple sticks of memory, some of those sticks of memory will be attached (associated as local through motherboard circuitry) to the first CPU socket. Additionally, other instances of sticks of memory will be attached to the second CPU socket. Thus, depending on which socket (e.g., application or execution unit executing on core of CPU in the socket) is trying to access the memory location, that memory location will be either "close" memory (attached to the same CPU as the process) or it will be a memory location on the other "distant" socket (e.g., attached to the other CPU). Accordingly, the access may be considered either an access to close memory or to distant memory and the analogy of distance may be related to latency. This analogy of distance is used in this disclosure for explanation purposes, however, note that physical distance may contribute to latency but may but not be a determining factor.

As referenced above, each physical partition of memory may be broken down into different logical portions. One example logical breakdown is provided here but other logical breakdowns or different terminology for the different portions may also be possible. In this example, the logical breakdown includes one or more Non-uniform memory access (NUMA) domains (or multiple regions with asymmetrical memory access). Each NUMA domain (or each of the multiple regions) will include multiple pages of equal size, which will then be divided into multiple slices of the same size (but smaller than a page size). Each slice will then be divided into objects which may be of different sizes on different slices but with all objects for a given slice having the same size. This segmentation will be discussed further below and is illustrated in FIG. 3. NUMA refers to a computer memory design used in multiprocessing, where the memory access time (latency) depends on the memory location relative to the processor. Under NUMA, a processor may access its own local memory faster than non-local memory (memory local to another processor or memory shared between processors). The benefits of NUMA may be more apparent for different types of devices. In particular, NUMA benefits may increase on servers or dedicated appliances where the data is often associated strongly with certain tasks, or users.

The disclosed memory management implementation includes a priority ordering of memory portions where, as explained further below, some states of memory are preferred over other states of memory as far as allocation and possibly de-allocation (freeing memory no longer in use by an execution unit). Memory states may include clean, active, dirty, partial, or full. States of memory are described in more detail below. Additionally, if a state prioritization is not applicable, for example, because not enough memory of a preferred state is available to satisfy a given request, then a secondary prioritization may be utilized to prioritize based on memory address. That is, a first level prioritization may be based on state with a secondary prioritization (e.g., based on memory address) and a third prioritization (e.g., based on affinity). In some implementations, further prioritization may take place or when prioritization techniques are not possible (e.g., they are attempted but not successful) a fallback to non-prioritized access may be provided. Additionally, in some implementations all prioritization levels may be implemented while in other implementations, only a subset of all disclosed prioritization techniques may be used. In short, the disclosed attributes of memory areas may be used in different ways to implement different prioritization schemes as appropriate (e.g., based on design criteria). One example implementation responds to allocation requests by a) first checking if slices are already associated with an execution unit, b) second checking state, c) third checking closeness, and d) fourth checking memory address. Other orders are also possible.

Having the above understanding of storage hierarchy, memory management, and determination of "closeness" of different memory locations with respect to how access latency may be affected by said closeness, a detailed implementation example is explained below with reference to the FIGS. Further, an example implementation for a network of devices that may implement the disclosed memory management techniques, for at least a portion of the processors on each device, is explained. Note that it is not required for all devices in a network, or processors of a device, to implement the same memory management techniques. However, processors sharing and/or having concurrent access to memory may be implemented to utilize a common memory management technique. Additionally, some level of virtualization may be implemented to abstract access to physical memory and the disclosed memory management technique that takes into account "closeness" may be implemented at the lowest abstraction level that interfaces to physical memory. Finally, as mentioned above, other storage techniques (e.g. in addition to memory management) may benefit from the techniques of this disclosure.

Figure 2:
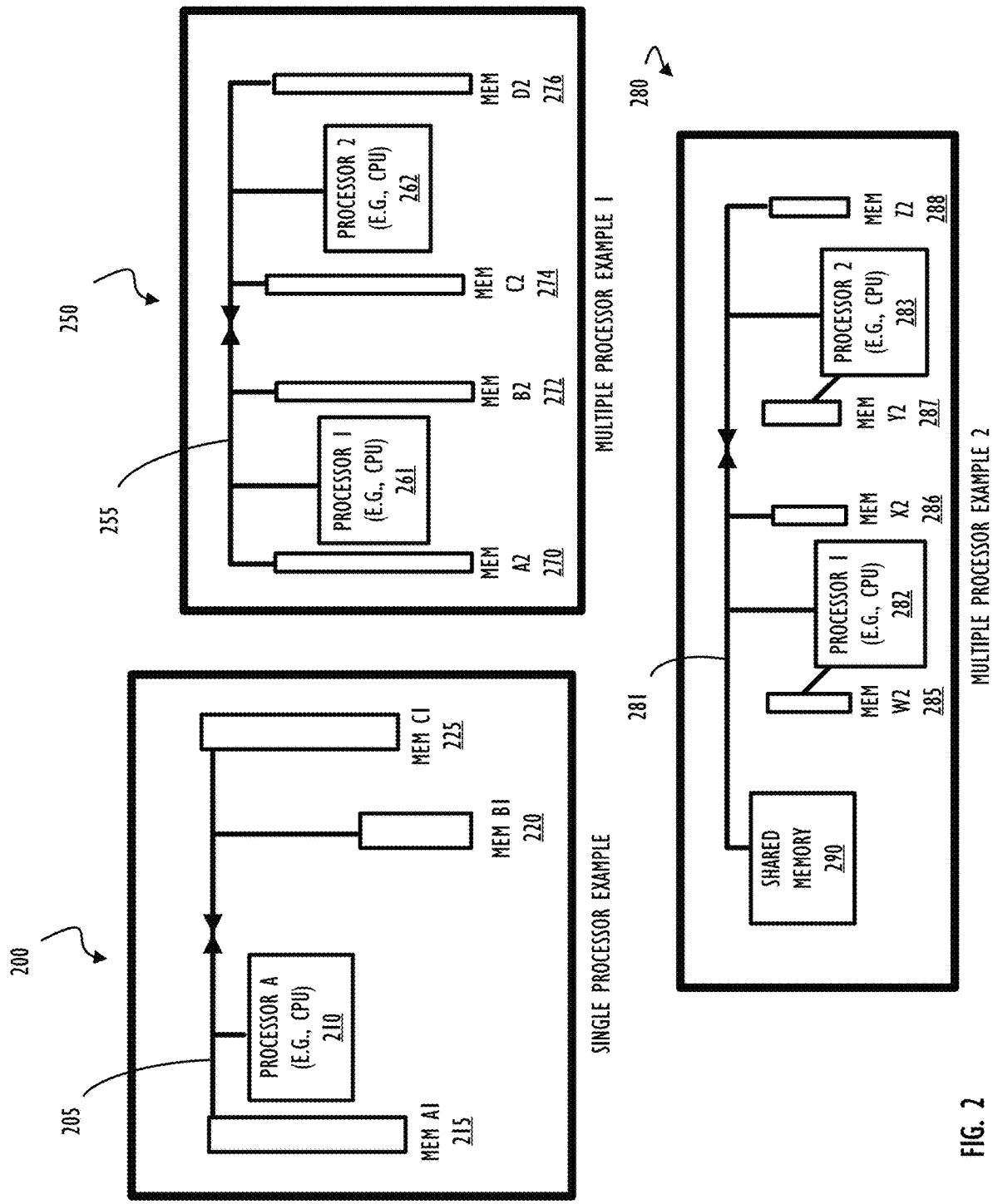
FIG. 2 is a block diagram representing different possible memory and processor configurations to illustrate "closeness" of a memory area to a hardware processor where a closer memory area may be accessed more efficiently than a further memory area, according to one or more disclosed implementations.

Referring to FIG. 2, a block diagram is illustrated representing different possible memory and processor configurations to illustrate "closeness" of a memory area to a hardware processor where a closer memory area may be accessed more efficiently (e.g., less overall latency) than a farther memory area, according to one or more disclosed implementations. In general, disclosed implementations are designed to provide an efficient memory location in request to a CPU's allocation request. If a socket requests an allocation of memory for an operation, that memory may preferably be provided from local memory instead of from remote memory. In general, when a particular execution unit (e.g., application or process) is running, that execution unit may be on a first CPU or on a second CPU (that may, change over time). Also, the execution unit may be on a particular core in the CPU with respect to multiple cores in the CPU. Based on the location of execution, disclosed implementation may have information regarding what available memory is local, what available memory is remote or distant, and what memory is even more remote or really distant. That is, disclosed implementations may associate an overall latency measurement (e.g. closeness as described above) with different available memory locations.

Some disclosed implementations attempt to find an allocate memory, in response to an allocation request, where the identified memory is as close as possible to an execution unit and thereby increase efficiency of overall operation. Additionally, but separately, another consideration of memory allocation may address situations where an execution unit may be expected to move between cores of a CPU or move between a set of CPUs on a computer device. For example, an execution unit might move between one core and another core because it goes to sleep and later wake up when a different core is available, or possibly another core on another CPU is available.

Accordingly, disclosed implementations address potential bulk movement of memory that was previously close to a core and associated execution unit so that it is freed from its previous location and made available at a new location that is close to the new (e.g., after movement) core. Efficient movement of memory allows for continued efficient execution, and allows additional execution units to have access to close memory when required. In one implementation, the allocator handles this by ensuring that the memory, once freed, is returned to the remote group it belongs to instead of the local group to which that execution unit has migrated. One problem that may be addressed by disclosed implementations is that, in a traditional memory allocator, over time memory may become fragmented and fragmentation generally makes allocation more difficult. Fragmentation may be caused, in part, because as execution units get moved around (e.g., by a scheduler) portions of available memory may become disjoint from other portions of available memory. Disclosed implementations attempt to reduce problems associated with fragmentation caused, in part, by execution unit relocation by maintaining a compact memory layout as opposed to a balanced memory layout (explained further below).

Returning to FIG. 2, single processor example 200 includes processor A 210 connected via memory bus 205 to three different memory partitions named MEM A1 215, MEM B1 220, and MEM C1 225, Each of these memory partitions refer to a physical partition of memory that may be implemented by one or more sticks of memory as described above. Single processor example 200 illustrates that MEM A1 215 is closest to processor A 210 with MEM B1 220 and MEM C1 being respectively farther (e.g., less close) from processor A 210. As noted above, "physical distance" is not necessarily a determining factor and is used in the examples of FIG. 2 as a pictorial representation for discussion purposes only. Thus, in this example, MEM A1 215 is illustrated to have the least overall latency to processor A 210, MEM B1 220 has an intermediate amount of overall latency to processor A 210, and MEM C1 225 has the most overall latency to processor A 210. Other memory areas (not shown) may also be available to processor A 210 but are not discussed in this example.

Multiple processor example 1 250 extends upon single processor example 200 to include four memory partitions and two processors. In multiple processor example 250, a single memory bus 255 provides access, for each of processor 1 261 and processor 2 262, to MEM A2 270, MEM B2 272, MEM C2 274, and MEM D2 276. As illustrated (pictorially) in this example, processor 1 261 is closest to MEM A2 270 and relatively close to MEM B2 272 with respect to either MEM C2 274 or MEM D2 276. MEM C2 276 is illustrated as farthest from processor 1 261. In contrast, each of MEM C2 and MEM D2 are illustrated as equidistant from processor 2 262. In this example, each of MEM B2 272 and MEM A2 270 are respectively farther from processor 2 262. As can be seen from this pictorial representation, different CPUs may have different overall latency (e.g., closeness) to different physical memory partitions and therefore, the disclosed allocation technique may take into account this closeness as part of satisfying memory allocation requests for execution units on each of the different processors. Note, that circuit boards and integrated circuits may consist of different layers of circuitry, so the amount of circuitry traversed to satisfy a request and transfer data may also include movement of data across three dimensions with only two dimensions being shown for illustrative purposes in FIG. 2.

Multiple processor example 2 280 extends the examples of FIG. 2 already discussed to include processors with "dedicated" memory and shared memory area 290. In this example, processor 1 282 has dedicated memory MEM W2

285 and processor 2 has dedicated memory MEM Y2 287. Even though a memory area might be designated as dedicated to a processor, that does not mean that another processor may not access and use that memory. In this context, dedicated refers to an association of memory to a processor such that the processor for which the memory partition is dedicated will be an intermediary for access to that memory. In other words, for processor 1 282 to access MEM Y2 287, the request will be serviced via interaction with processor 2 283. Clearly, having this additional interaction may lead to an increase in overall (and possibly variable) latency for processor 1 282 to access MEM Y2 287. As a result, it may be determined that MEM Y2 287 is farther from (and have a corresponding higher overall latency with respect to) processor 1 282 than, for example, EM Z2 288 (even though pictorially this may not appear to be the case).

Also shown in multiple processor example 2 280, shared memory 290 represents an area of memory that may be designed to efficiently interface with multiple sockets of a motherboard (and their corresponding CPU) such that no socket necessarily has preferred access to shared memory 280. Note, that even though shared memory 290 may be efficiently accessed from each of multiple CPUs, they each may have a different closeness determination with respect to shared memory 290 and other available memory areas. That is, the closeness of shared memory area 290 to processor 1 282 may be different than the closeness of shared memory area 290 to processor 2 283. Further, the relative closeness of shared memory area 290 with respect to other available memory areas may be expected to be different for each CPU. Each of the memory areas illustrated in multiple processor example 2 280 may be accessed via memory bus 281 except for the dedicated memory areas MEM W2 285 and MEM Z2 288 which may be accessed either directly from the processor for which they are dedicated to, or by a combination of memory bus 281 and assistance of a remote processor. In one disclosed implementation, a memory allocator may assign a "memory location cost" for each available memory area from the perspective of each individual socket (and corresponding CPU). This memory location cost may be derived, in part, from the closeness attribute discussed above and latency based on specification of the memory. Accordingly, this memory location cost may take into account overall latency with respect to each CPU accessing each different memory partition.

Referring now to FIG. 3, block diagram 300 is illustrated to represent a memory allocation segmentation example including domains, pages, slices, and objects, according to one or more disclosed implementations. As mentioned above, different physical memory partitions may be divided into logical, portions and sub-portions to implement different memory allocation techniques. In one disclosed example, a high level portion of memory may be logically segregated into memory domains with an allocator map 305 that may be used with a unified allocator representing one example memory management technique of this disclosure. In this context, a memory domain represents a set of memory that has a consistent locality for access. In a system of two CPUs like the multiple processor examples of FIG. 2, there might be two different memory domains; one for each CPU (as illustrated by a map for group 1 310 that may be associated with a CPU plugged into a first socket and a map for group 2 311 for a second socket. Alternatively, although not shown in this example, each CPU might have two domains, for example, if that CPU has two channels of memory. Any number of memory domains is possible, the actual number in any given implementation may depend on an overall amount of memory and number of different physical memory partitions, that may need to be managed (or other factors).

Continuing with the example of block diagram 300, each domain may be further organized (e.g., sub-divided to create sub-portions) into pages such as page 315 (shown in block diagram 200 as an element of Group 1 and enlarged for further detail). Page 315 may be further organized into slices such as slice 320 with each slice containing a plurality of different objects. As illustrated, each slice may be restricted to only contain objects, of a consistent size, but objects may be of a different size for a different slice. In the example of FIG. 3, there are three different object sizes illustrated, namely 5128 objects 330, 1K objects 335, and 2K objects 325. Other sizes are also possible depending on implementation requirements. Slices may not be designated to contain a particular size until an allocation request is satisfied that utilizes that particular slice. Domains may be broken down and logically segregated into any number of slices. Each of the slices may go through different states that may include individual states of: clean, active, dirty, partial, or full. In some implementations, a state machine may be used to maintain state transitions of different slices. A slice may be considered clean when no allocation has taken place for that slice. A slice may become active when a first object is created and allocated for that slice (e.g., the slice is first used since a computer device restart). When a slice is active the slice is currently in use (i.e., being allocated from by an execution unit). In some implementations, the active state trumps all other states —regardless of how many objects are present (or free) in a slice, if it is currently being allocated from by an execution unit, that slice is considered in the active state. A slice may be considered dirty after objects from that slice have been allocated to an execution unit and freed after use. A slice may be considered partial if a subset of a large percentage of the objects of that slice are currently allocated to an execution unit, but it is not full (e.g., more than 25% free). A slice may be considered full when almost all objects (e.g., less than 25% free) of that slice are allocated to an execution unit (e.g., either an executing or suspended execution unit). The amount of usage (e.g., usage of objects within a given slice) for a slice to transition from partial state to a full state may be configurable and may be referred to as a "full threshold" which, in this example, is set to 25% to indicate a number of objects equal to 25% of the total number of objects in a given slice.

In addition to the above mentioned memory location cost, there may be an additional "state allocation cost" based on the state of different portions of memory. In some implementations, the disclosed memory allocator may take into account both of these costs when determining how to satisfy (e.g., respond to) a memory allocation request from either the operating system or an intermittent execution unit.

In one implementation the state allocation cost reflects a cost for initial allocation and may also take into account overall memory availability for future requests. As mentioned above, fragmentation may result in degradation of performance so, techniques to minimize fragmentation of memory may be beneficially implemented even if a slightly higher initial cost may be incurred. In one example of state allocation cost, a state of dirty may be slightly more expensive than a state of partial while partial is significantly less expensive than, a state of full. A state of clean may be given a slightly more expensive state allocation cost than dirty. In general, each of the state allocation costs may be thought of as a ranking with a relative priority for each state. This ranking is not necessarily a linear ranking and variations in state allocation costs may be subtle or significant.

In one example implementation, a memory allocator may respond to a request for memory (e.g., allocation request) by determining which of the set of the available slices are in each possible state. Then allocation may be satisfied by selecting from only that subset of those available slices that is in a most preferred state. If there are no slices available at the most preferred state (or not enough to satisfy the request in total), then a next most preferred state may be used to augment those in the most preferred state and ultimately satisfy the allocation request. This process may be repeated until enough satisfactory slices (e.g., available and in a most preferred state based on a least overall state allocation cost) are selected to satisfy the memory allocation request.

After an initial prioritized identification of slices as described above, there may be a second level of prioritization applied to select the actual slices to utilize in fulfilling the request. In this example, the second prioritization may be a prioritization of which of the slices in a particular state will be used in the allocation. In one implementation, the slices may be secondly prioritized based on a lowest memory address. This is, in part, because an execution unit may need two different slices. For example, the execution unit may need a slice for use to store a large number of small objects and may use another slice to store larger objects. These slices are logically separated, in this example, in part, because as stated above, a slice may only contain objects of one size at a time. Because memory has been assigned based on all of the above applicable priorities, when memory is freed in smaller pieces by an execution unit, slices may end up in a configuration where some space is in use but not all of the slice is in use. As a result of the prioritization to lower memory addresses and prioritization to slices in a partial state, each slice will tend to be kept as full as possible for slices that are in use. Also, slices that are not in use will remain unused (or clean). This allocation technique may be thought of as compacting memory (e.g., a compact memory layout) by trying to concentrate requests for memory of one size into a minimum number of slices as much as possible to reduce fragmentation at the slice level and make available a completely clean or dirty slice that may be used/re-used to satisfy a request for a different object size more efficiently. In this context, re-using a slice may include restructuring the slice to include objects of a different size than were used in a previous allocation. That is, a slice that is not in use but is dirty and contains 512K objects may be reformatted into either 1K or 2K objects and allocated again at this new object size. Use of a lower memory address may be replaced with tending toward higher memory addresses in an alternate embodiment to achieve similar results of compactness.

In a simple example, consider 100 slices of memory that are allocated at 50% of total memory. Some memory management techniques may result in each of the slices being equally used (e.g., half used, as in this example) and tend toward a balanced memory layout. In contrast, the disclosed prioritization techniques may tend toward using 100% of 50 slices and leaving the other 50 slices completely free (e.g. a compact memory layout). By compacting memory as much as possible, slices remain available for future use as needed.

Figure 4:
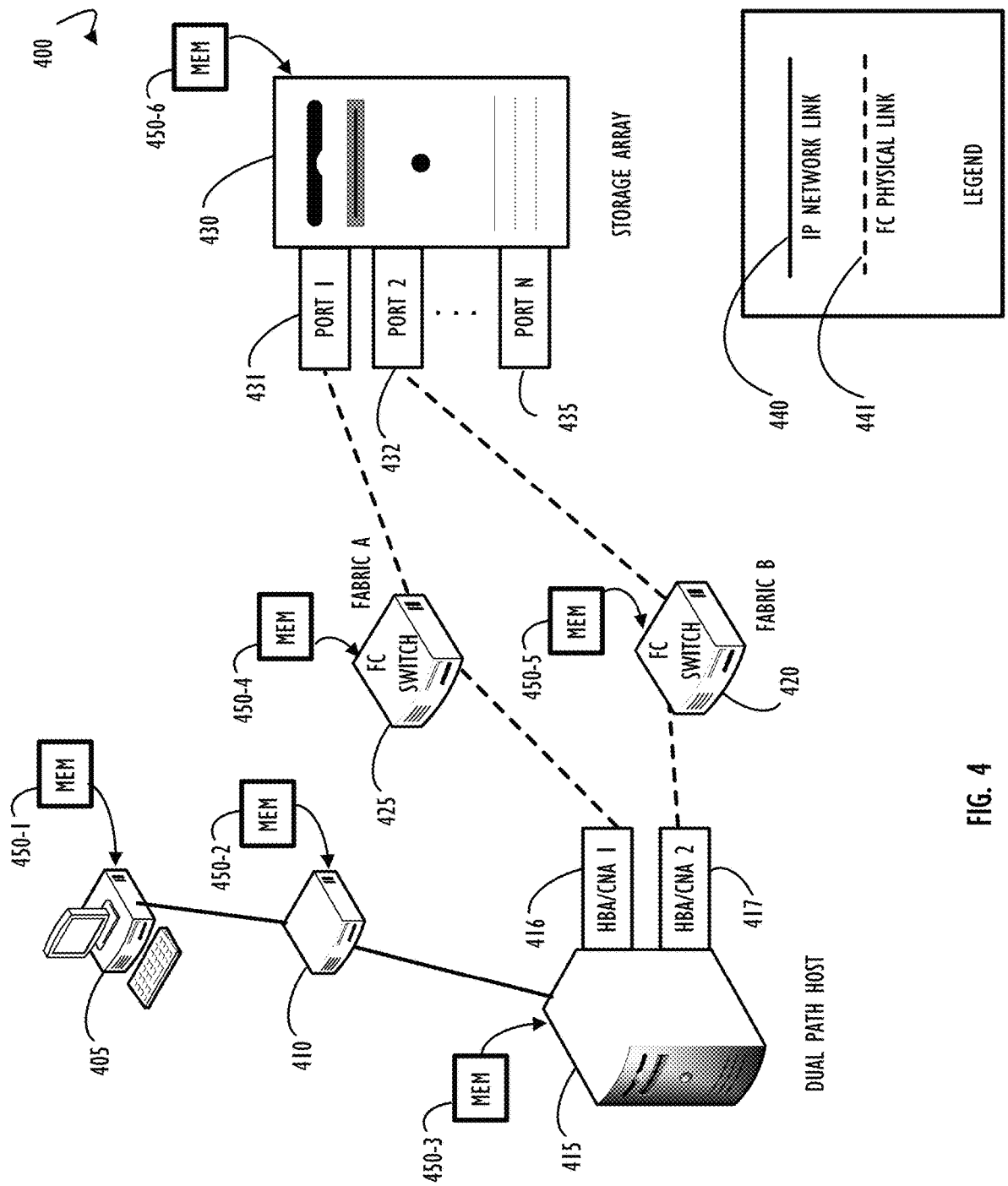
FIG. 4 is a block diagram representation of a distributed network environment including multiple computers (e.g., systems) and a simplified FC network where each device may include memory that may benefit from the memory allocation techniques of this disclosure, according to one or more disclosed implementations.

FIG. 4 is a block diagram representation of a distributed network environment 400 including multiple computers (e.g., systems) and a simplified FC network where each device may include memory that may benefit from the memory allocation techniques of this disclosure, according to one or more disclosed implementations. Distributed network environment 400 includes a client device 405, a network switch 410, two FC switches 420 and 425, a server device, which in this example is dual path host 415, and a storage array 430 connected via a simplified FC network and Internet protocol (IP) network. Each of the devices of this example may implement a memory management technique for its corresponding memory area identified by elements 450-1 through 450-6. This example has been simplified for illustrative purposes and real world implementations may be expected to include many additional components as well as additional instances of the components shown.

In distributed network environment 400 there is a client device 405 (incorporating MEM 450-1) connected through an IP network link 440 (represented as a solid line) to IP switch device 410 (incorporating MEM 450-2) which is in turn connected, again through an IP network link 440, to dual path host 415. Dual path host 415 incorporates MEM 450-3 and represents any of many different possible types of servers (e.g., application server, database server, storage server, etc.). In this example dual path host 415 also includes two independent HBA/CNA interfaces, namely HBA/CNA 1 416 and HBA/CNA 417. By having more than one interface, dual path host 415 may have redundant connections to either IP-based networks or FC networks (e.g., for redundancy or performance as mentioned above). Devices with redundancy may run for extended periods of time and therefore further benefit from the disclosed memory allocation techniques. For example, a high-availability device may benefit from disclosed techniques both because of performance reasons and because run-time fragmentation of memory may be reduced.

Continuing with FIG. 4, network 400 includes two independent FC fabrics, namely fabric A maintained, in this example, with FC switch 425 and fabric B maintained, in this example, with FC switch 420. In this example, storage array 430 includes Port 1 431 that is illustrated as connecting to fabric A, via an FC physical link 140 (illustrated as a dashed line), using FC switch 425. Port 2 432 is illustrated as connecting to fabric B, via a different FC physical link 140 using FC switch 420. Port N 435 is illustrated to indicate that storage array 430 may include any number of ports connected to any number of additional fabrics (not shown) or to provide additional connections to either fabric A or fabric B of network 400. Each of these switches and storage array 430 may include memory managed by disclosed memory allocation techniques (e.g., MEM 450-4, MEM 450-5, and MEM 450-6).

Figure 5:
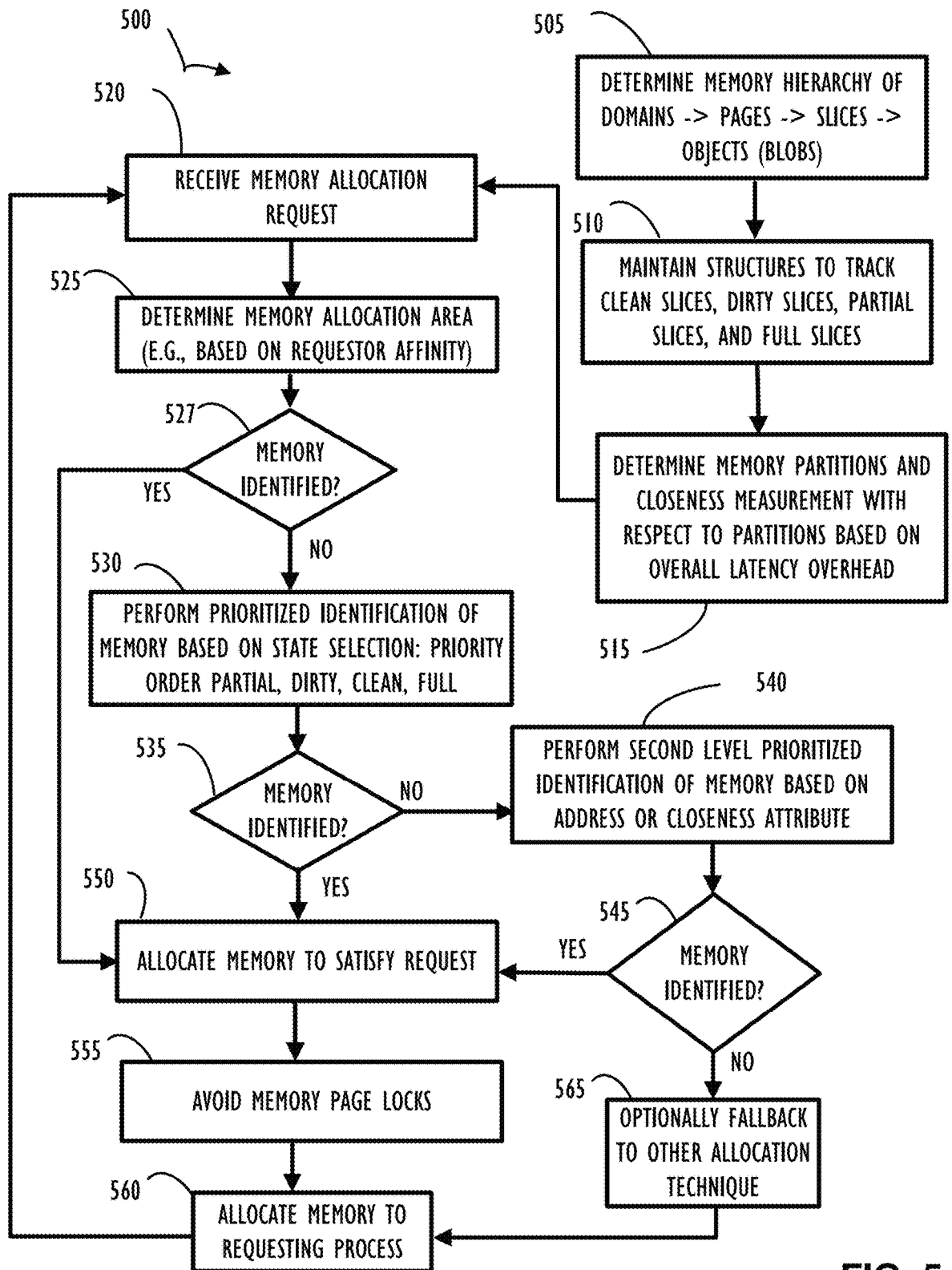
FIG. 5 is a flow chart representing a possible technique for memory allocation (e.g., as may be performed by a memory allocator function implemented in software, firmware, hardware, or a combination thereof), according to one or more disclosed implementations.

FIG. 5 is a flow chart representing a possible technique for memory allocation, according to one or more disclosed implementations. In some implementations, separate data structures may be used to handle memory portions (e.g., domains, pages, objects, and slices) and management of slices may be implemented such that slices are monitored and controlled, in part, based on different states for each slice. The different states for a slice may vary from one implementation but may include states such as clean slices (never before used), dirty slices (completely free but previously used and possibly set for an object size), partial slices (around 25% or more free), and full slices (approximately less than 25% objects free). As mentioned above, for one example implementation, when a slice is to be selected for allocation there may be an order of preference for retrieving areas based on a state of available slices. In one example, the priority order is partial, dirty, clean, and then full. Partial slices are used first, in this example, in part, because partial slices are known to have a reasonable count of objects that can be allocated and if a request may be satisfied, then dedicating any new slices to a particular size may be avoided. Dirty slices may be used as a second priority, in part, because dirty slices are more likely to be available in a cache memory area and metadata of dirty slices may be already initialized for a requested object size (resulting in less allocation overhead). Clean slices may be used as a third priority, in part, because they guarantee a full set of objects are available. Full slices may be used as a fourth priority, in part, because a cost of obtaining a slice may be relatively high and typically includes a page lock overhead. Further, a full slice may not be capable of providing many objects before completely filling. In this example, slices that are clean have no assigned object size and are therefore equally useful for any allocation size. Once a slice has been chosen for a particular size that slice will never return to a clean state. Also, in this example, when a slice is completely empty (all used objects in that slice have been freed by all execution units) that slice becomes a dirty slice which may be preferably re-used for the same object size to satisfy a new allocation request. However, if a different allocation size for objects is required and no slices segregated into that object size are already available, either a clean slice may be selected, or a dirty slice may have its metadata rebuilt to reflect the new object size. Clearly, rebuilding the meta data incurs some additional overhead so avoiding this may be desirable.

In some implementations, headers (e.g., a slice header) may be maintained as a form of metadata for slices. For example, some implementations may maintain at least two lists of free objects for each slice. For example, a local free list and a remote free list. A thread (e.g., execution unit or portion thereof) owning a slice has exclusive access to the local list and is allowed to allocate new objects from the local list. The remote list is used, in this example, when other threads free an object belonging to that slice. Access to remote objects may be provided by atomic swaps. Thus, whenever the owning thread's local list becomes empty, a check may be performed for any freed objects on the remote list and use an atomic swap to move the objects associated with remote list into the local list for new allocations. The net result of this atomic swap procedure may provide for threads to be able to allocate and free to the same slice in parallel without contending and without maintaining object caches that may increase fragmentation.

In some example implementations, the total number of objects in the system will change overtime. If there are a large number of small allocations, the count of total objects will increase. If memory is primarily being used for large allocations (e.g., up to 32KiB) there will be fewer total objects. Because of this, the allocation for object headers cannot be completely static for this example implementation. For typical allocation sizes the object header allocation may be used exclusively. Thus, if a slice is used for a small object size, such as 512 bytes, more object headers will be necessary. In this case the slice may use some of the user data region for the additional object headers. Overall, this example may reduce memory overhead on slices for large objects while also negating the need for dynamic allocations for object headers.

Additionally, for performance reasons, in some implementations most sizes (e.g., page size, slice size, object size) supported by the disclosed memory allocator are maintained at powers of two. This type of implementations allows bit shifts to be used for at least a portion of the math functions performed by the allocator that may result in further performance improvements of the disclosed memory allocation technique. Any power of two for an object size that is greater than the implementation's pointer granularity and smaller than the slice size (e.g. 1 MiB) may then be handled efficiently with the bit shifts.

In some implementations, one example of metadata overhead may be associated with object headers, which, in this example, are 16 bytes each and may store both state used by the allocator and information about the most recent execution unit(s) to use the object. For this reason, the smallest object size enabled may tend to be approximately (or exactly) 256 bytes. The metadata overhead may also be reduced if the metadata itself was integrated directly into the space of free objects. However, this type of implementation may reduce or eliminate some benefits such as a level of protection against metadata corruption.

There are at least three sets of heuristics that may be maintained by the disclosed memory allocation techniques (and possibly maintained locally by the memory allocator). These three heuristics may be used by an allocator to reduce the build up of fragmentation over time. Two of the three example heuristics may be maintained at the page level and one may be maintained at the domain level. Specifically, within a page, allocations, in some disclosed implementations, are always preferred from slices in the partial state, as it is desirable to maintain empty slices for as long as possible (e.g., in case empty slices need to be re-used for a different allocation size). Furthermore, among the slices in the partial state in the page, disclosed implementations may choose the slice that has the lowest (or highest) memory address (e.g., based on a prioritization described above). As also mentioned above, this type of prioritization may tend to compact memory towards lower addresses and make it more likely for higher addresses to remain empty and therefore ready to be used for new allocation sizes. In addition to the prioritization and compaction provided at the page level, the third heuristic may be maintained at the domain level. In this example, there may be a domain entry for each contiguous set of 64 Pages (Note: with 1 MiB slices and 64 slices per page. As illustrated in this example implementation, 64 pages would represent 4GiB). The domain entry heuristic may be used to track the set of pages that have clean or dirty slices, and the set of pages that have partial slices at each size. Accordingly, when locating a new page to request a slice from, the lowest address page from the partial state may be preferably used, followed by the lowest address page from the empty state. This type of implementation may extend the memory compaction beyond page ranges to large sections of a domain and further reduce fragmentation that may even further increase performance over time (especially for long running devices).

Returning to FIG. 5, a flow chart is illustrated to represent a possible method 500 to use in the disclosed memory allocation techniques. For example, a memory allocator function may implement method 500 as part of its processing algorithm to satisfy memory allocation requests for a computer device. Method 500 begins at block 505 where a determination may be made as to defining a hierarchy of memory portions that may include the hierarchy of domain, page, slice and object discussed above. Flow continues to block 510 where data structures may be maintained to track attributes (including state and latency attributes) for portions of memory at each segregation level. Block 515 indicates that statistics for memory partitions may be determined and added to any appropriate tracking data structures (depending on implementation requirements). Block 520 indicates that a request for allocation of memory may be received, for example, at a memory allocator function. Block 525 indicates that a determination may be made as to which available portions of memory may satisfy the request. Block 525 also indicates that a slice may already be in use by an execution unit and have enough available memory of an appropriate object size to satisfy a memory allocation request. This affinity to a memory area by an execution unit may be honored prior to investigating other available memory areas. Decision 527 determines if, based on affinity alone, memory to satisfy an allocation request may be identified. If so, the YES prong of decision 527, flow may continue to block 550 (discussed below) to perform the allocation. However, if not, the NO prong of decision 527 flow may continue to block 530 where additional slices may be determined as necessary. Note, that the flow of example method 500 is presented as an example only and the order of selection criteria may be prioritized in a different order than shown. In one example implementation, Active memory (e.g., memory in use by an execution unit) may have a highest priority among different selection criteria (as shown in method 500). Further, the additional selection criteria, such as state, closeness, address, may be applied in different orders based on design criteria. Specifically, the priority order of affinity, state, closeness, and address (i.e., in that order) has been found beneficial in some implementations.

Block 530 indicates that a prioritized identification of memory (e.g., domains, pages, slices, and objects) may be performed. For example, as described above with a prioritization based on a state allocation cost and a memory location allocation cost using each of these costs either alone or in combination. Decision 535 determines if sufficient and appropriate memory has been determined to satisfy the memory allocation request. If not, the NO prong of decision 535, flow continues to block 540 where a second level prioritization may be performed for the memory determination. For example, a second level prioritization based on memory address or closeness attribute (or a combination thereof). Decision 545 determines if, after the second level prioritization, memory has been identified to satisfy the request. If not, the NO prong of decision 545, flow continues to block 565 where a fallback to other allocation techniques may be used to determine if any remaining memory may be required to either augment the already determined memory (e.g., based on the first and second level prioritization) or if a technique other than prioritized selection may be used to satisfy the allocation request. Block 565 represents a special case that preferably would never be activated in an actual system.

Returning to decision 535 (and 545), if after either of these decisions it is determined that sufficient and appropriate memory has been identified to satisfy the allocation request, the YES prong of either 535 or 545, flow continues to block 550 where the prioritized identified memory may be allocated. For example, the above mentioned control data structures may be updated to reflect the allocation to an execution unit and the memory may be made available to that execution unit. Block 555 indicates that, where possible, page locks may be avoided when allocating memory. Block 560 indicates that, once memory is made available to the requesting execution unit (thread, process, or application) flow may return to block 520 to wait for a next memory allocation request.

Figure 6:
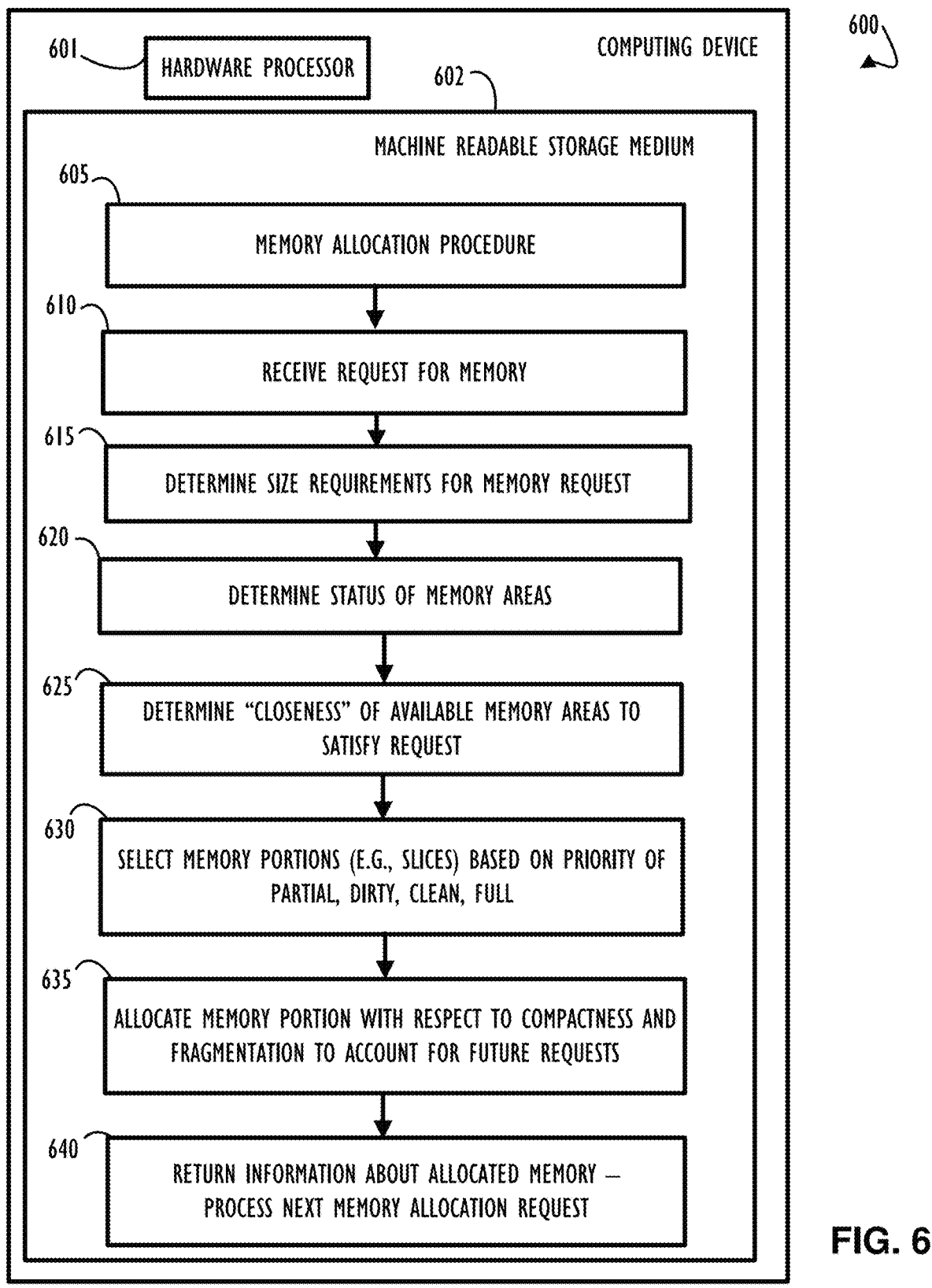
FIG. 6 is a block diagram representing a computing device implementing a technique to allocate memory, according to one or more disclosed implementations.

FIG. 6 is a block diagram representing a computing device 600 to support memory allocation techniques (e.g., a memory allocator function), according to one or more disclosed implementations. Computing device 600 includes at least one hardware processor 601 and a machine readable storage medium 602. As illustrated, machine readable medium 602 may store instructions, that when executed by hardware processor 601 (either directly or via emulation/virtualization), cause hardware processor 601 to perform one or more disclosed techniques to allocate memory based on a prioritized selection of available memory from a hierarchy of memory portions.

The technique implemented by instructions stored on machine readable storage medium 602 and performed by hardware processor 601 may be similar to that of method 500 discussed above. Block 605 indicates that instructions may be stored to cause one or more hardware processors to perform a memory allocation procedure. Block 610 indicates that instructions may cause hardware processor 601 to receive a request for memory (e.g., an allocation request). Block 615 indicates that the instructions may determine size requirements appropriate to satisfy the memory allocation request. Block 625 indicates that a closeness attribute of available memory area may be used as part of a determination performed by hardware processor 601. Block 630 indicates that instructions may cause hardware processor 601 to select available memory portions based on a priority of slices with respect to different states (and possibly other attributes) of all available slices (and objects). Block 635 indicates that memory portions may be allocated in a manner to increase compactness of memory and reduce overall memory fragmentation. Block 640 indicates that the memory may be allocated to the requesting execution unit (e.g., process, thread, or application) and a return to wait for a next request may be performed.

Figure 7:
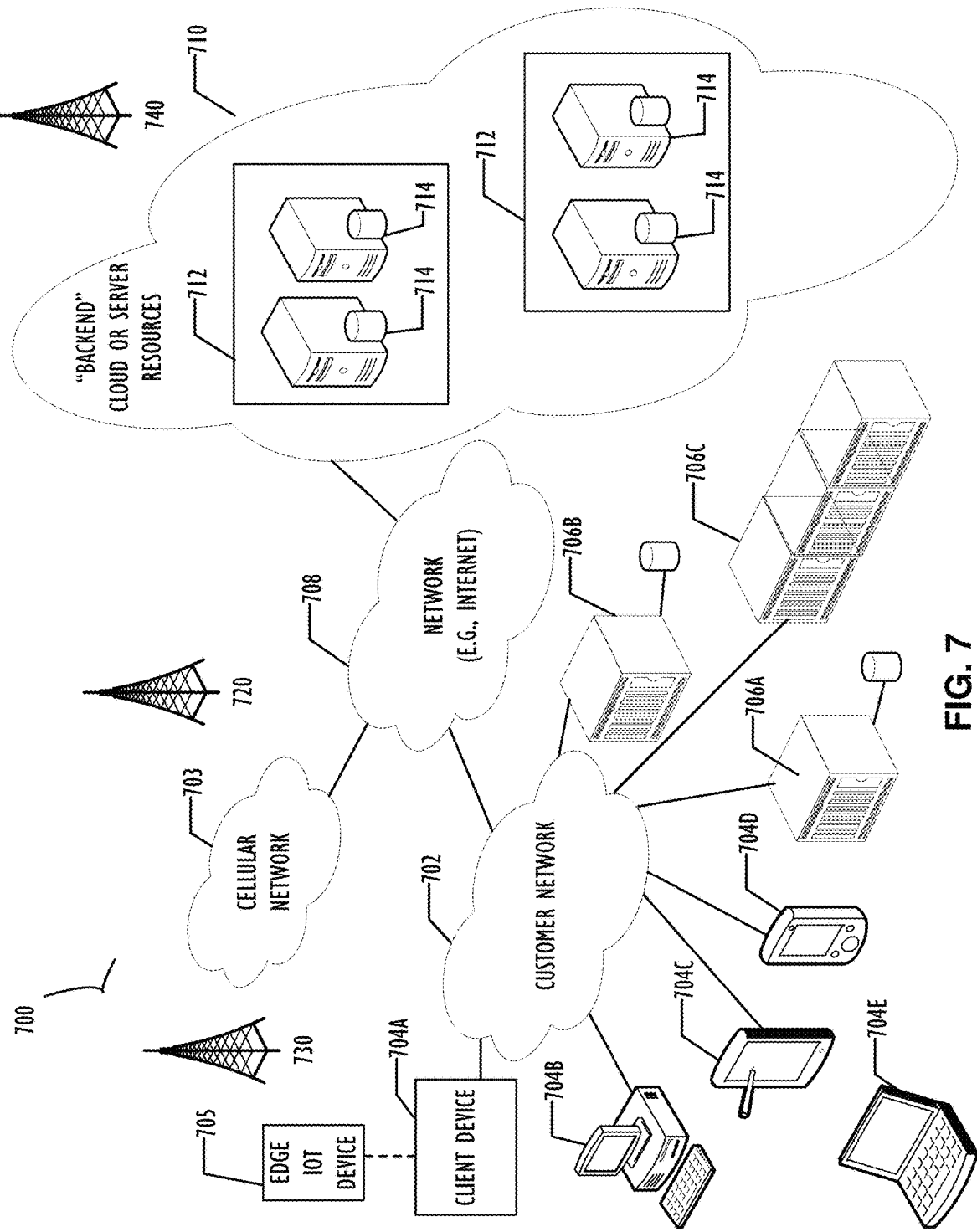
FIG. 7 represents a computer network infrastructure that may include different types of devices that may each implement all or part of the disclosed memory allocation, techniques, according to one or more disclosed implementations.

FIG. 7 represents a computer network infrastructure that may be used to implement all or part of the disclosed memory management techniques, according to one or more disclosed implementations. Network infrastructure 700 includes a set of networks where implementations of the present disclosure may operate, including the disclosed prioritized memory allocation techniques. For example, there may be multiple servers supporting data storage implemented within hardware clusters that have nodes at different locations (e.g., data centers) and those data centers may communicate with each other through network infrastructure 700. Network infrastructure 700 comprises a customer network 702, network 708, cellular network 703, and a cloud service provider network 710. Any of these networks may have nodes providing or receiving messages from servers and/or network devices configured in accordance with this disclosure. That is, each of these different networks may include one or more HBAs or CNAs on a network communication device that may benefit from the concepts of this disclosure. In one implementation, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another implementation, customer network 702 represents an enterprise network that could include or be communicatively coupled to one or more local area networks (LANs), virtual networks, data centers and/or other remote networks (e.g., 708, 710). In the context of the present disclosure, customer network 702 may include one or more high-availability data stores (e.g., quorum data store), switches, or network devices using methods and techniques such as those described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A. In this context, client devices should not be confused with a client application of a server-based application (or distributed application) because they represent devices in a client-server architecture rather than applications. However, while it is true that client devices may often run client applications, there are situations where a client device will execute the server side of a client-server application such that the client device communicates with a server device (e.g., executing the client application) to request remote execution on behalf of the client device. That is, the client device may execute a server application portion with the server device executing the client application portion for a given client-server application architecture. In general, the client portion of an application is the portion that requests some work and receives the results of the work, with the server portion receiving the request for work, performing that work, and providing the results.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server (e.g., a data storage server for a SAN), access point, router, or other device configured to provide for local computational resources and/or facilitate communication amongst networks and devices. For example, local compute resources 706A-C may be one or more physical local hardware devices that implement memory management techniques as described above to allow them to perform for long periods of time without restarting. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one implementation, cloud service provider network 710 includes one or more data centers 712 with one or more server instances 714. Cloud service provider network 710 may also include one or more frames or clusters (and cluster groups) representing a scalable compute resource that may benefit from the techniques of this disclosure. Also, cloud service providers typically require near perfect uptime availability and may use the disclosed techniques, methods, and systems to provide that level of service.

Figure 8:
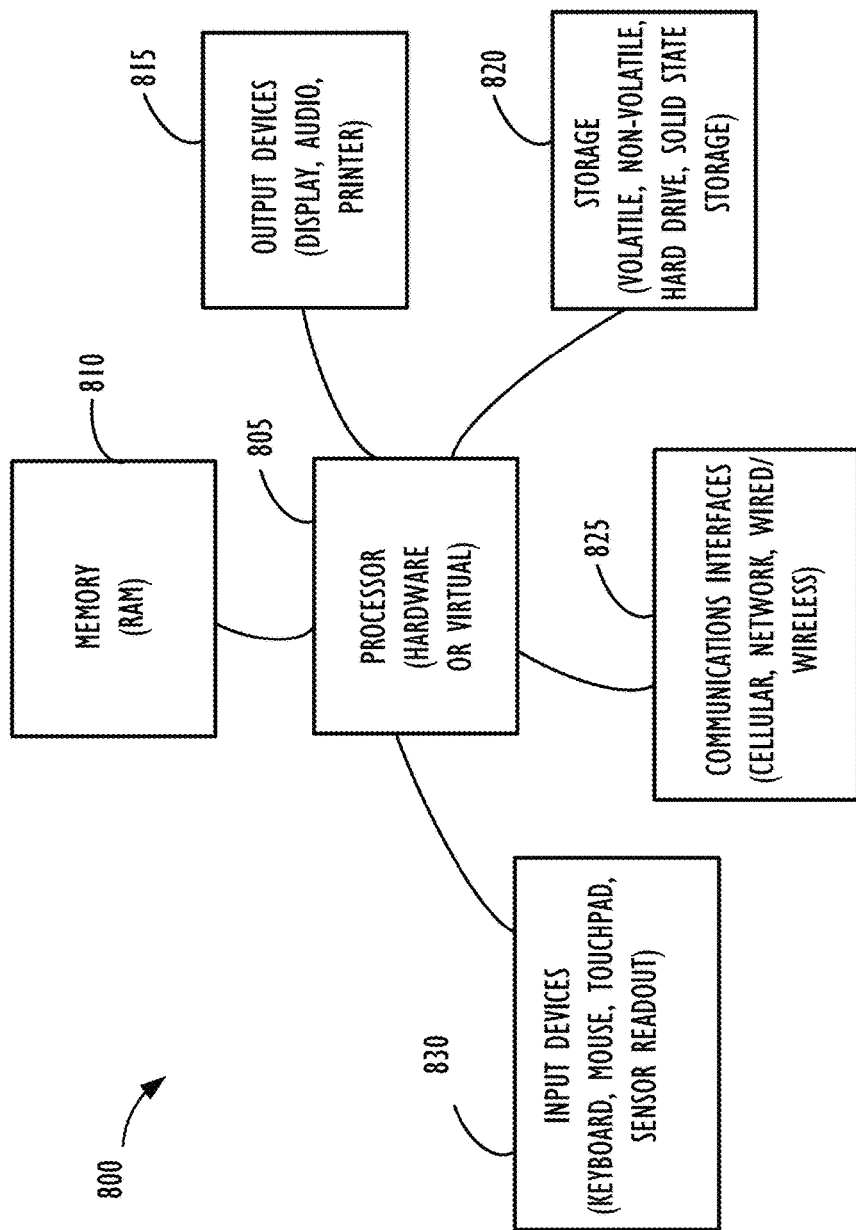
FIG. 8 illustrates a computer processing device that may implement the functions, modules, processing platforms, execution platforms, communication devices, and other methods and processes discussed in this disclosure.

FIG. 8 illustrates a computing device 800 that may be used to implement or be used with the functions, modules, processing platforms, execution platforms, communication devices, and other methods and processes of this disclosure. For example, computing device 800 illustrated in FIG. 8 could represent a client device or a physical server device as illustrated in either of FIG. 4 or 7. Each device may include either hardware or virtual processor(s) depending on the level of abstraction of the computing device. Specifically, each of the storage servers, application servers, network devices, and other processing devices discussed above may be considered instances of a computing device similar to computing device 800. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one implementation, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more implementations, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) and a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one implementation, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method of managing memory for a computer device, the method comprising:
    partitioning physical memory on the computer device into a hierarchy of portions, the hierarchy of portions including:
        one or more pages;
        each of the one or more pages including one or more slices; and
        each of the slices including one or more objects, wherein each of the one or more objects within a slice are a consistent size, and wherein any slice in a clean state and any slice in a dirty state is available for use at any object size but then an assigned object size remains constant while active;
    maintaining a set of states reflecting memory usage status with one state from the set of states associated with each slice, the set of states including:
        the clean state to indicate the slice has not been allocated for use since a system restart;
        a partial state to indicate the slice contains less than a full threshold number of available objects; and
        the dirty state to indicate the slice currently contains no objects and has previously been used for allocation of objects of a determined size; and
        a full state;
    receiving a memory allocation request from a unit of execution executing on a hardware processor to allocate memory; and
    responsive to the request, determining a set of objects from the one or more slices to return to the unit of execution to satisfy the memory allocation request, wherein the set of objects is determined from the one or more slices based on a first priority order of the states for the one or more slices, wherein the first priority order of the states is the partial state, the dirty state, the clean state, and the full state.

2. The computer-implemented method of claim 1, wherein the first priority order is associated with a state allocation cost.

3. The computer-implemented method of claim 2, wherein the state allocation cost reflects that: the partial state is preferred over the dirty state which is preferred over the clean state which is preferred over the full state, wherein the full state indicates that more than a full threshold of objects of the slice are in use.

4. The computer-implemented method of claim 1, wherein:
the set of objects to return is determined further based on a second priority order based on a memory addresses of the slices.

5. The computer-implemented method of claim 4, wherein the second priority order is to prioritize either slices with lower memory addresses or slices with higher memory addresses.

6. The computer-implemented method of claim 1, wherein:
the set of objects to return is determined further based on a closeness attribute for physical memory reflecting a memory location cost.

7. The computer-implemented method of claim 1, further comprising:
returning the set of objects to the unit of execution.

8. The computer-implemented method of claim 1, further comprising:
maintaining at least two data structures for each slice including a local free list and a remote free list.

9. A computer device, comprising:
a hardware processor;
one or more physical memory areas directly accessible to the first hardware processor; and
an instruction memory area communicatively coupled to the first hardware processor, wherein the instruction memory area stores instructions, that when executed by the first hardware processor, cause the first hardware processor to:
partition each of the one or more physical memory areas into a hierarchy of portions, the hierarchy of portions including:
one or more pages, each of the one or more pages including one or more slices; and
each of the one or more slices including one or more objects, wherein each of the one or more objects within a slice are a consistent size, and wherein any slice in a clean state and any slice in a dirty state is available for use at any object size;
maintain a set of states reflecting memory usage status for each of the one or more slices, the set of states including:
an active state, the clean state; a partial state; a full state; and the dirty state, wherein the clean state indicates an unused slice, the partial state indicates a slice with available objects, the full state indicates a slice with more than a full threshold of objects in use, and the dirty state indicates a slice that was previously used and has all objects available;
receive a memory allocation request from a unit of execution executing on the first hardware processor to allocate memory; and
select one or more objects from the one or more slices, in part, based on a respective state allocation costs as a ranking with a relative priority for each state associated with the one or more slices.

10. The computer device of claim 9, wherein the state allocation costs are associated with a first priority order of the states for the one or more slices, including the partial state, followed by the dirty state, followed by the clean state, followed by the full state.

11. The computer device of claim 10, wherein the instruction memory area further comprises instructions, that when executed by the first hardware processor, cause the first hardware processor to:
select the one or more objects further based on a second priority order based on a memory addresses of the one or more slices; and
return the selected one or more objects to the execution unit for use in processing.

12. The computer device of claim 11, wherein the second priority order is to prioritize slices with lower memory addresses or with higher memory addresses.

13. The computer device of claim 9, wherein:
the set of objects to return is determined further based on a closeness attribute for each of the one or more physical memory areas relative to each other.

14. A non-transitory computer readable medium comprising computer executable instructions stored thereon that when executed by one or more hardware processors, cause the one or more hardware processors to:
partition each of the one or more physical memory areas into a hierarchy of portions, the hierarchy of portions including:
a domain level including one or more domains;
each of the one or more domains including one or more pages;
each of the pages including one or more slices; and
each of the slices including one or more objects, wherein each of the one or more objects within a slice are a consistent size, and wherein any slice in a clean state and any slice in a dirty state is available for use at any object size;
maintain a set of states reflecting memory usage status for each of the one or more slices, the set of states including:
the clean state; a partial state; a full state; and the dirty state, wherein the clean state indicates an unused slice, the partial state indicates a slice with available objects, the full state indicates a slice with more than a full threshold of objects in use, and the dirty state indicates a slice that was previously used and has all objects available;
receive a memory allocation request from a unit of execution executing on the first hardware processor to allocate memory; and
select one or more objects from the one or more slices, in part, based on respective state allocation costs as a ranking with a relative priority for each state associated with the one or more slices; and
return the selected one or more objects to the execution unit for use in processing.

15. The non-transitory computer readable medium of claim 14, wherein the state allocation costs are associated with a first priority order of the states for the one or more slices, including the partial state, followed by the dirty state, followed by the clean state, followed by the full state.

16. The non-transitory computer readable medium of claim 15, wherein the instructions further comprise instructions executable by one or more hardware processors to:
select the one or more objects to return further based on a second priority order based on memory addresses of the one or more slices.

17. The non-transitory computer readable medium of claim 14, wherein the second priority order is to prioritize slices with lower memory addresses or slices with higher memory addresses.

18. The non-transitory computer readable medium of claim 14, wherein:
the set of objects to return is determined further based on a closeness attribute for each of the one or more physical memory areas relative to each other.

* * * * *